(12) United States Patent
Gilson et al.

(10) Patent No.: US 11,698,348 B2
(45) Date of Patent: Jul. 11, 2023

(54) SELF-REFERENCING MICROWAVE SENSING SYSTEM

(71) Applicant: Raytheon Technologies Corporation, Farmington, CT (US)

(72) Inventors: Jonathan Gilson, West Hartford, CT (US); Joseph V. Mantese, Ellington, CT (US); Gurkan Gok, Milford, CT (US); Goran Djuknic, New York, NY (US); Coy Bruce Wood, Ellington, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 327 days.

(21) Appl. No.: 17/062,998

(22) Filed: Oct. 5, 2020

(65) Prior Publication Data

US 2022/0107277 A1 Apr. 7, 2022

(51) Int. Cl.
  *G01N 22/00* (2006.01)
  *G01M 15/14* (2006.01)

(52) U.S. Cl.
  CPC .......... *G01N 22/00* (2013.01); *G01M 15/14* (2013.01)

(58) Field of Classification Search
  CPC ........ F01D 11/20; F01D 17/06; F01D 21/003; F01D 21/02; F01D 21/04;
  (Continued)

(56) References Cited

U.S. PATENT DOCUMENTS

| 3,308,468 A | 3/1967 | Hannan |
| 3,308,469 A | 3/1967 | Hannan |

(Continued)

FOREIGN PATENT DOCUMENTS

| DE | 19705769 A1 | 8/1998 |
| EP | 3291041 A1 | 3/2018 |

(Continued)

OTHER PUBLICATIONS

European Office Action for European Application No. 21201068.0; Application Filing Date: Oct. 5, 2021; Date of Action: Feb. 21, 2022; 9 pages.

(Continued)

*Primary Examiner* — Eldon T Brockman
(74) *Attorney, Agent, or Firm* — Cantor Colburn LLP

(57) ABSTRACT

A system of a machine includes a waveguide system and a radio frequency transceiver/detector coupled to the waveguide system and configured to emit a calibration signal in the waveguide system to establish a reference baseline between the radio frequency transceiver/detector and a calibration plane associated with an aperture of the waveguide system, emit a measurement signal in the waveguide system to transmit a radio frequency signal from the radio frequency transceiver/detector out of the aperture of the waveguide system, and detect a reflection of the measurement signal at the radio frequency transceiver/detector based on an interaction between the measurement signal and a component of the machine. A measurement result of the reflection of the measurement signal can be adjusted with respect to a reflection of the calibration signal.

15 Claims, 6 Drawing Sheets

(58) Field of Classification Search
CPC ........ F05D 2270/802; F05D 2270/805; G01M 15/14; G01N 22/00; G01S 13/88; G01S 7/4078; Y02T 50/60
See application file for complete search history.

(56) References Cited

U.S. PATENT DOCUMENTS

| | | | |
|---|---|---|---|
| 4,533,884 A | | 8/1985 | Hudspeth et al. |
| 5,039,948 A | * | 8/1991 | Astier .................. G01N 22/00 333/248 |
| 5,212,943 A | | 5/1993 | Harris |
| 5,479,826 A | * | 1/1996 | Twerdochlib ............ G01H 9/00 73/660 |
| 5,818,242 A | | 10/1998 | Grzybowski et al. |
| 6,717,418 B2 | | 4/2004 | Orenstein |
| 7,231,180 B2 | | 6/2007 | Benson et al. |
| 7,276,703 B2 | | 10/2007 | Berkean et al. |
| 7,355,163 B2 | * | 4/2008 | Watley ................. G01M 11/083 374/E11.015 |
| 7,688,081 B2 | | 3/2010 | Webster |
| 7,722,310 B2 | | 5/2010 | Balasubramaniam et al. |
| 7,825,669 B2 | * | 11/2010 | Parsons .................. G01S 13/87 324/637 |
| 7,890,293 B2 | | 2/2011 | Bosselmann et al. |
| 8,121,813 B2 | | 2/2012 | Ren et al. |
| 8,552,597 B2 | | 10/2013 | Song et al. |
| 8,558,538 B2 | | 10/2013 | Phillips et al. |
| 9,057,596 B2 | * | 6/2015 | Xu ......................... G01B 15/00 |
| 9,303,523 B2 | | 4/2016 | Rodriguez et al. |
| 9,677,868 B2 | | 6/2017 | Singh et al. |
| 9,986,310 B2 | | 5/2018 | Sobanski et al. |
| 10,247,031 B2 | | 4/2019 | Carter et al. |
| 10,280,787 B2 | | 5/2019 | Pratt et al. |
| 10,307,138 B2 | | 6/2019 | Heims et al. |
| 10,309,342 B2 | | 6/2019 | Mueller et al. |
| 10,316,686 B2 | | 6/2019 | Hudson et al. |
| 10,411,756 B2 | | 9/2019 | Snyder et al. |
| 10,716,488 B2 | * | 7/2020 | Ostadrahimi .......... G01N 22/00 |
| 10,826,547 B1 | | 11/2020 | Gilson et al. |
| 10,998,958 B1 | | 5/2021 | Gilson et al. |
| 11,215,655 B2 | * | 1/2022 | Schultz ................. G01R 27/28 |
| 11,265,380 B1 | | 3/2022 | Gilson et al. |
| 2003/0094956 A1 | | 5/2003 | Orenstein |
| 2007/0114422 A1 | | 5/2007 | Berkcan et al. |
| 2009/0272028 A1 | | 11/2009 | Drozd et al. |
| 2010/0066387 A1 | | 3/2010 | Bosselmann et al. |
| 2010/0292905 A1 | | 11/2010 | Agrawal et al. |
| 2011/0018686 A1 | | 1/2011 | Fahley et al. |
| 2011/0194122 A1 | | 8/2011 | Heyworth et al. |
| 2012/0079830 A1 | | 4/2012 | Rodriguez et al. |
| 2012/0119020 A1 | | 5/2012 | Burns et al. |
| 2014/0083183 A1 | | 3/2014 | Edvardsson |
| 2015/0022373 A1 | | 1/2015 | Bommer et al. |
| 2016/0273973 A1 | * | 9/2016 | Larsen .................. G01K 13/02 |
| 2017/0007254 A1 | | 1/2017 | Jaworek et al. |
| 2017/0335795 A1 | | 11/2017 | Klemen et al. |
| 2018/0219579 A1 | | 8/2018 | Britz et al. |
| 2018/0266969 A1 | | 9/2018 | Jean et al. |
| 2018/0289359 A1 | | 10/2018 | Heims et al. |
| 2018/0294838 A1 | | 10/2018 | Snyder et al. |
| 2018/0375590 A1 | | 12/2018 | Skertic et al. |
| 2019/0186438 A1 | | 6/2019 | Lowery et al. |
| 2019/0250058 A1 | | 8/2019 | Schofield |
| 2022/0107277 A1 | | 4/2022 | Gilson et al. |
| 2022/0109327 A1 | | 4/2022 | Gilson et al. |
| 2022/0190855 A1 | | 6/2022 | Gilson et al. |

FOREIGN PATENT DOCUMENTS

| | | |
|---|---|---|
| EP | 3291570 A1 | 3/2018 |
| EP | 3296635 A1 | 3/2018 |
| EP | 3826188 A1 | 5/2021 |
| WO | 2011153496 A1 | 12/2011 |

OTHER PUBLICATIONS

European Partial Search Report for European Application No. 21201073.0; Application Filing Date: Oct. 5, 2021; Date of Action Feb. 24, 2022; 13 pages.

European Search Report for European Application No. 21201061.5; Application Filing Date: Oct. 5, 2021; Date of Action: Mar. 7, 2022; 8 pages.

European Search Report for European Application No. 21201074.8; Application Filing Date: Oct. 5, 2021; Date of Action: Feb. 28, 2022; 6 pages.

Partial European Search Report for European Application No. 21201062.3; Application Filing Date: Oct. 5, 2021; Date of Search: Feb. 28, 2022; 10 pages.

* cited by examiner

SELF-REFERENCING MICROWAVE SENSING SYSTEM

BACKGROUND

This disclosure relates to electromagnetic sensing systems, and more particularly to a self-referencing microwave sensing system.

Measurement systems can be used to observe various parameters to control machine operation and monitor system health. Some locations within a machine can be difficult to measure due to moving parts, internal operating environment, or machine configuration. Further, complex electronics used for sensing may not be suitable for higher temperature environments, such as proximate to fuel combustion locations. Environmental factors can also impact the accuracy of some measurement systems due to thermal expansion, vibration, strain, and other such factors which can vary during machine operation.

BRIEF DESCRIPTION

According to one embodiment, a system of a machine includes a waveguide system and a radio frequency transceiver/detector coupled to the waveguide system and configured to emit a calibration signal in the waveguide system to establish a reference baseline between the radio frequency transceiver/detector and a calibration plane associated with an aperture of the waveguide system, emit a measurement signal in the waveguide system to transmit a radio frequency signal from the radio frequency transceiver/detector out of the aperture of the waveguide system, and detect a reflection of the measurement signal at the radio frequency transceiver/detector based on an interaction between the measurement signal and a component of the machine. A measurement result of the reflection of the measurement signal can be adjusted with respect to a reflection of the calibration signal.

In addition to one or more of the features described above or below, or as an alternative, further embodiments may include where the waveguide system includes a calibration channel with a reflective load configured to reflect the calibration signal emitted from the radio frequency transceiver/detector, and a measurement channel configured to emit the measurement signal out of the aperture and receive the reflection of the measurement signal.

In addition to one or more of the features described above or below, or as an alternative, further embodiments may include where the waveguide system further includes a coupler configured to subtract the reflection of the calibration signal from the reflection of the measurement signal.

In addition to one or more of the features described above or below, or as an alternative, further embodiments may include where the waveguide system includes a ceramic window proximate to the aperture of the waveguide system.

In addition to one or more of the features described above or below, or as an alternative, further embodiments may include where the waveguide system includes a mode selective filter proximate to the ceramic window. The mode selective filter can be configured to reflect the calibration signal and allow the measurement signal through the ceramic window based on a mode difference between the calibration signal and the measurement signal.

In addition to one or more of the features described above or below, or as an alternative, further embodiments may include where the waveguide system includes a power-controlled switch proximate to the ceramic window. The power-controlled switch can be configured to reflect the calibration signal and allow the measurement signal through the ceramic window based on a power difference between the calibration signal and the measurement signal.

In addition to one or more of the features described above or below, or as an alternative, further embodiments may include where the calibration signal is an optical signal configured to reflect off of the ceramic window, and the measurement signal is a microwave signal configured to pass through the ceramic window.

According to an embodiment, a system for a gas turbine engine includes network of a plurality of nodes distributed throughout the gas turbine engine, a controller of the gas turbine engine, and a radio frequency sensing system coupled to the network of nodes. Each of the nodes can be associated with at least one sensor and/or actuator of the gas turbine engine and operable to communicate through one or more radio frequencies. The controller can be operable to communicate with the network of nodes through the one or more radio frequencies. The radio frequency sensing system can include a waveguide system and a radio frequency transceiver/detector coupled to the waveguide system and configured to emit a calibration signal in the waveguide system to establish a reference baseline between the radio frequency transceiver/detector and a calibration plane associated with an aperture of the waveguide system, emit a measurement signal in the waveguide system to transmit a radio frequency signal from the radio frequency transceiver/detector out of the aperture of the waveguide system, and detect a reflection of the measurement signal at the radio frequency transceiver/detector based on an interaction between the measurement signal and a component of the gas turbine engine. A measurement result of the reflection of the measurement signal can be adjusted with respect to a reflection of the calibration signal.

In addition to one or more of the features described above or below, or as an alternative, further embodiments may include where the component monitored by the radio frequency sensing system is a rotating component of the gas turbine engine.

According to an embodiment, a method of self-referencing radio frequency sensing in a machine includes emitting a calibration signal in a waveguide system to establish a reference baseline between a radio frequency transceiver/detector and a calibration plane associated with an aperture of the waveguide system in the machine. A measurement signal is emitted in the waveguide system to transmit a radio frequency signal from the radio frequency transceiver/detector out of the aperture of the waveguide system. A reflection of the measurement signal is detected at the radio frequency transceiver/detector based on an interaction between the measurement signal and a component of the machine. A calibrated measurement result associated with the component of the machine is determined based on adjusting a measurement result of the reflection of the measurement signal with respect to a reflection of the calibration signal.

In addition to one or more of the features described above or below, or as an alternative, further embodiments may include subtracting the reflection of the calibration signal from the reflection of the measurement signal by a coupler of the waveguide system.

In addition to one or more of the features described above or below, or as an alternative, further embodiments may include reflecting the calibration signal by a mode selective filter, and allowing the measurement signal to pass through the mode selective filter based on a mode difference between the calibration signal and the measurement signal.

In addition to one or more of the features described above or below, or as an alternative, further embodiments may include reflecting the calibration signal by a power-controlled switch, and allowing the measurement signal to pass through the power-controlled switch based on a power difference between the calibration signal and the measurement signal.

A technical effect of the apparatus, systems and methods is achieved by a radio frequency sensing system to monitor one or more components of a machine as described herein.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
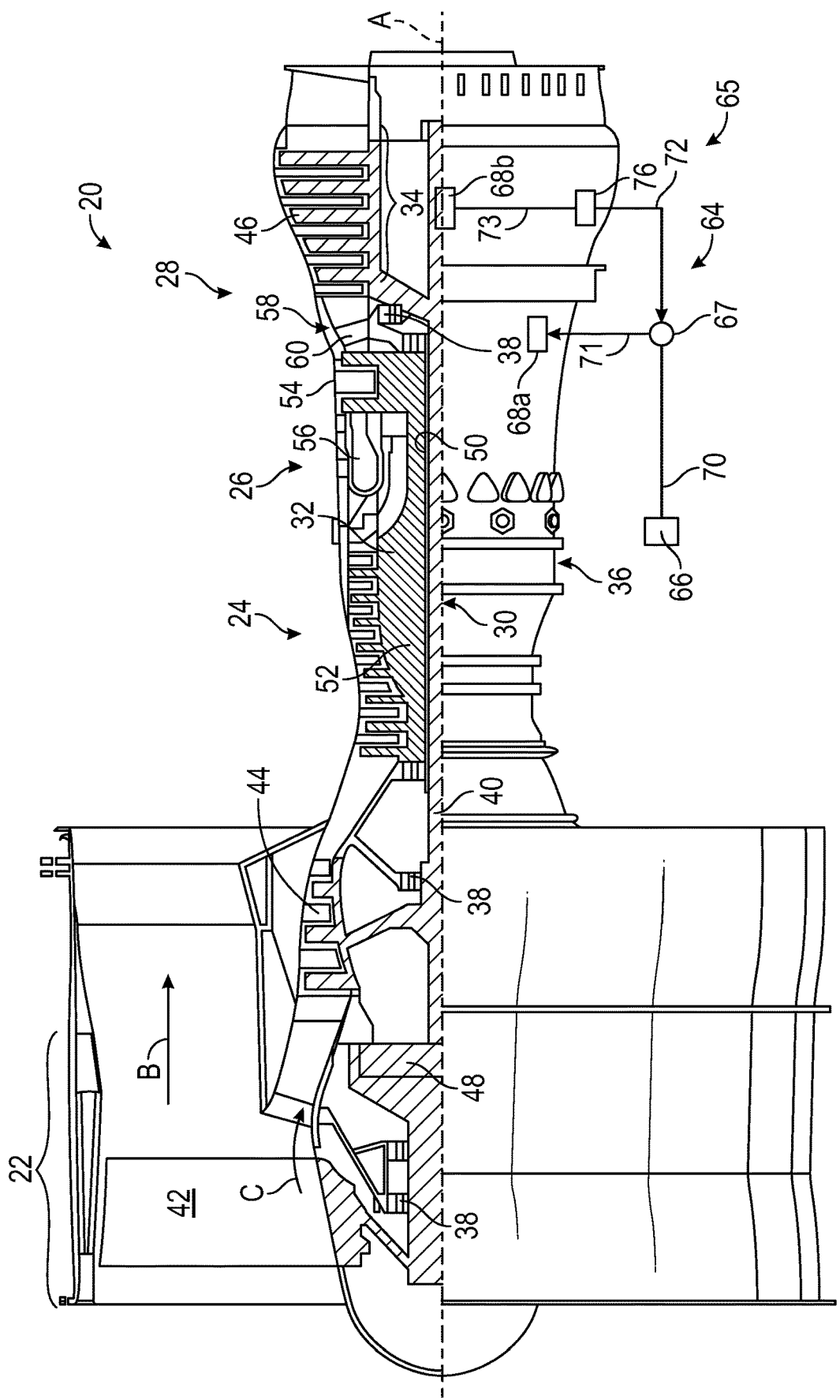
FIG. 1 is a cross-sectional view of a gas turbine engine as an example of a machine.

Various embodiments of the present disclosure are related to electromagnetic communication through and to components of a machine as part of a sensing and control system. FIG. 1 schematically illustrates a gas turbine engine 20 as one example of a machine as further described herein. The gas turbine engine 20 is depicted as a two-spool turbofan that generally incorporates a fan section 22, a compressor section 24, a combustor section 26 and a turbine section 28. The fan section 22 drives air along a bypass flow path B in a bypass duct to provide a majority of the thrust, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures or any other machine that requires sensors to operate with similar environmental challenges or constraints. Additionally, the concepts described herein may be applied to any machine or system comprised of control and/or health monitoring systems. Examples can include various moderate to high temperature environments, such as glass and metal forming systems, petroleum-oil-and-gas (POG) systems, ground-based turbine for energy generation, nuclear power systems, and transportation systems.

With continued reference to FIG. 1, the exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine engine 20 between the high pressure compressor 52 and the high pressure turbine 54. A mid-turbine frame 58 of the engine static structure 36 is arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48. In direct drive configurations, the gear system 48 can be omitted.

The engine 20 in one example is a high-bypass geared aircraft engine. Low pressure turbine 46 pressure ratio is pressure measured prior to inlet of low pressure turbine 46 as related to the pressure at the outlet of the low pressure turbine 46 prior to an exhaust nozzle. A significant amount of thrust can be provided by the bypass flow B due to the high bypass ratio. The example low pressure turbine 46 can provide the driving power to rotate the fan section 22 and therefore the relationship between the number of turbine rotors 34 in the low pressure turbine 46 and the number of blades in the fan section 22 can establish increased power transfer efficiency.

The disclosed example gas turbine engine 20 includes a control and health monitoring system 64 (generally referred to as system 64) utilized to monitor component performance and function. The system 64 includes a network 65, which is an example of a guided electromagnetic transmission network. The network 65 includes a controller 66 operable to communicate with nodes 68a, 68b through electromagnetic signals. The controller 66 may include various support interfaces and processing resources, such as input/output interfaces, processing systems, memory systems, communication interfaces, power management systems, and the like. The nodes 68a, 68b can be distributed throughout the gas turbine engine 20 or other such machine. Node 68a is an example of an actuator node that can drive one or more actuators/effectors of the gas turbine engine 20. Node 68b is an example of a sensor node that can interface with one or more sensors of the gas turbine engine 20. Nodes 68a, 68b can include processing support circuitry to transmit/receive electromagnetic signals between sensors or actuators and the controller 66. A coupler 67 can be configured as a splitter between a waveguide 70 coupled to the controller 66 and waveguides 71 and 72 configured to establish wireless communication with nodes 68a and 68b respectively. The coupler 67 can be a simple splitter or may include a repeater function to condition electromagnetic signals sent between the controller 66 and nodes 68a, 68b. In the example of FIG. 1, a radio frequency-based repeater 76 is interposed between the coupler 67 and node 68b, where waveguide 72 is a first waveguide coupled to the coupler 67 and radio frequency-based repeater 76, and waveguide 73 is a second waveguide coupled to the radio frequency-based repeater 76 and node 68b. Collectively, waveguides 70, 71, 72, 73 are configured to transmit radio frequencies (e.g., electromagnetic signals) between the controller 66 and one or more of the nodes 68a, 68b. The transmission media within waveguides 70-73 may include dielectric or gaseous material. In embodiments, the waveguides 70-73 can be hollow metal tubes. The waveguides 70-73 may be rigid or may include flexible material. The disclosed system 64 may be utilized to control and/or monitor any component function or characteristic of a turbomachine, aircraft component operation, and/or other machines.

Prior control & diagnostic system architectures utilized in various applications include a centralized system architecture in which the processing functions reside in an electronic control module. Actuator and sensor communications were accomplished through analog wiring for power, command, position feedback, sensor excitation and sensor signals. Cables and connections include shielding to minimize effects caused by electromagnetic interference (EMI). The use of analog wiring and the required connections can limit application and capability of such systems due to the ability to locate wires, connectors and electronics in harsh environments that experience extremes in temperature, pressure, and/or vibration. Exemplary embodiments can use radio frequencies broadcast through waveguides 70-73 in a wireless architecture to provide both electromagnetic communication signals and power to the individual elements of the network 65.

The use of electromagnetic radiation in the form of radio waves (MHz to GHz) to communicate and power the sensors and actuators using a traditionally complex wired system provides substantial architectural simplification, especially as it pertains to size, weight, and power (SWaP). Embodiments provide extension of a network where reduced SNR may compromise network performance by trading off data rates for an expansion of the number of nodes and distribution lines; thereby providing more nodes/sensors, with greater interconnectivity.

Figure 2:
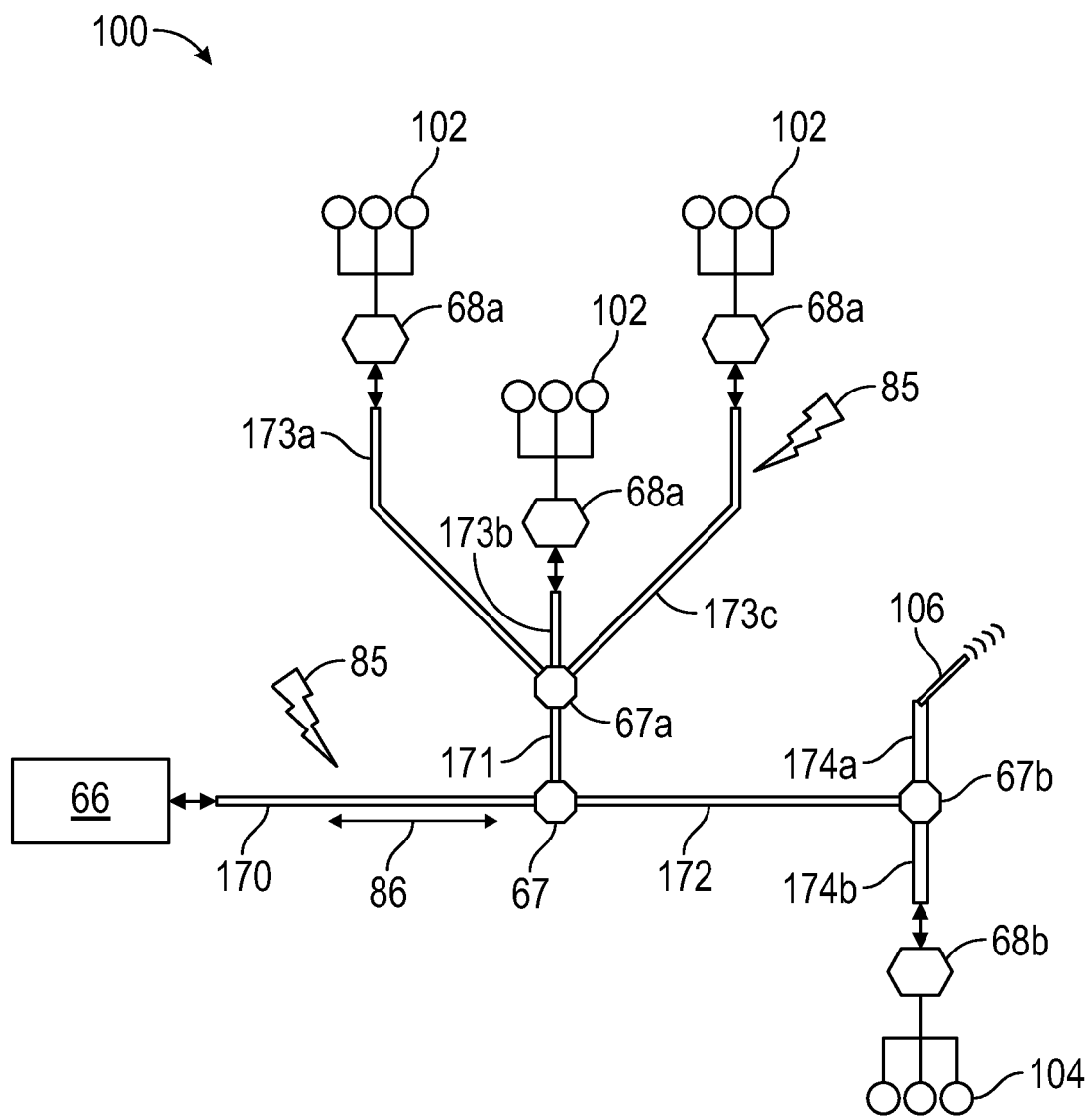
FIG. 2 is a schematic view of a guided electromagnetic transmission network in accordance with an embodiment of the disclosure.

Referring to FIG. 2, a guided electromagnetic transmission network 100 is depicted as an example expansion of the network 65 of FIG. 1. The guided electromagnetic transmission network 100 can include the controller 66 coupled to coupler 67 through waveguide 170. The coupler 67 is further coupled to coupler 67a through waveguide 171 and to coupler 67b through waveguide 172. Coupler 67a is further coupled to three nodes 68a through waveguides 173a, 173b, 173c in parallel. Each of the nodes 68a can interface or be combined with multiple actuators 102. Coupler 67b is also coupled to a radio frequency sensing system 106 through waveguide 174a and to node 68b through waveguides 174b. The radio frequency sensing system 106 can be a direct radio frequency interface where signals emitted from the controller 66 can be used to measure one or more components of a machine. Node 68b can interface or be combined with multiple sensors 104. Although depicted in FIG. 2 as an extension of waveguide 174a, the radio frequency sensing system 106 can have an associated interface node similar to node 68b to manage signal generation separately from other communications within the guided electromagnetic transmission network 100. Further, the coupler 67b may include electronics to support calibration and measurement through the radio frequency sensing system 106. The radio frequency sensing system 106 may use radio frequency emissions in the microwave spectrum to measure component characteristics, such as turbine blades in the turbine section 28 of the gas turbine engine 20 of FIG. 1. For instance, a turbine blade passing in proximity to a measurement position of the radio frequency sensing system 106 may be detected as a change in reflected signals with a scattering of an emitted measurement signal. Compressor blades, fan blades, and other such moving components may also or alternatively be monitored by the radio frequency sensing system 106. Further, the radio frequency sensing system 106 may be used to detect components within a machine core or in accessory components, such as in components coupled to or in close proximity to the machine. Radio frequencies selected for use by the radio frequency sensing system 106 can be tuned for a desired application and can range, for example, between MHz and GHz frequency bands, although lower or higher frequencies may be supported.

Although the example of FIG. 2 depicts connections to actuators 102 and sensors 104 isolated to different branches, it will be understood that actuators 102, sensors 104, and radio frequency sensing systems 106 can be interspersed with each other and need not be isolated on dedicated branches of the guided electromagnetic transmission network 100. Couplers 67, 67a, 67b can be splitters and/or can incorporate instances of the radio frequency-based repeater 76 of FIG. 1. Further, one or more instances of the radio frequency-based repeater 76 can be installed at any of the waveguides 170, 171, 172, 173a-c, and/or 174a-b depending on the signal requirements of the guided electromagnetic transmission network 100.

Nodes 68a, 68b and the radio frequency sensing system 106 can be associated with particular engine components, actuators or any other machine part from which information and communication is performed for monitoring and/or control purposes. The nodes 68a, 68b and the radio frequency sensing system 106 may contain a single or multiple electronic circuits or sensors configured to communicate over the guided electromagnetic transmission network 100.

The controller 66 can send and receive power and data to and from the nodes 68a, 68b. The controller 66 may be located on equipment near other system components or located remotely as desired to meet application requirements.

A transmission path (TP) between the controller 66 and nodes 68a, 68b can be used to send and receive data routed through the controller 66 from a control module or other components. The TP may utilize electrical wire, optic fiber, waveguide or any other electromagnetic communication including radio frequency/microwave electromagnetic energy, visible or non-visible light. The interface between the controller 66 and nodes 68a, 68b can transmit power and signals.

The example nodes 68a, 68b may include radio-frequency identification devices along with processing, memory and/or the interfaces to connect to conventional sensors or actuators, such as solenoids or electro-hydraulic servo valves. The waveguides 170, 171, 172, 173a-c, and/or 174a-b can be shielded paths that support electromagnetic communication, including, for instance, radio frequency, microwaves, magnetic or optic waveguide transmission. Shielding can be provided such that electromagnetic energy or light interference 85 with electromagnetic signals 86 (shown schematically as arrows) are mitigated in the guided electromagnetic transmission network 100. Moreover, the shielding provides that the electromagnetic signals 86 are less likely to propagate into the environment outside the guided electromagnetic transmission network 100 and provide unauthorized access to information. In some embodiments, electromagnetic radiation can be in the range 1-100 GHz. Electromagnetic radiation can be more tightly arranged around specific carrier frequencies, such as 3-4.5 GHz, 24 GHz, 60 GHz, or 76-77 GHz as examples in the microwave spectrum. A carrier frequency can transmit electric power, as well as communicate information, to multiple nodes 68a, 68b using various modulation and signaling techniques.

The nodes 68a with actuators 102 may include control devices, such as a solenoid, switch or other physical actuation devices. Radio frequency identification, electromagnetic or optical devices implemented as the nodes 68b with sensors 104 can provide information indicative of a physical parameter, such as pressure, temperature, speed, proximity, vibration, identification, and/or other parameters used for identifying, monitoring or controlling component operation. Signals from the radio frequency sensing system 106 may be used to detect various aspects, such as a distance, rotational speed, acceleration, vibration, component damage, and other such component parameters. Signals communicated in the guided electromagnetic transmission network 100 may employ techniques such as checksums, hash algorithms, error control algorithms and/or encryption to mitigate cyber security threats and interference.

In some embodiments, shielding in the guided electromagnetic transmission network 100 can be provided such that power and communication signals are shielded from outside interference, which may be caused by environmental electromagnetic or optic interference. Moreover, the shielding limits intentional interference 85 with communication at each component. Intentional interference 85 may take the form of unauthorized data capture, data insertion, general disruption and/or any other action that degrades system communication. Environmental sources of interference 85 may originate from noise generated from proximate electrical systems in other components or machinery along with electrostatic and magnetic fields, and/or any broadcast signals from transmitters or receivers. Additionally, environmental phenomena, such as cosmic radio frequency radiation, lightning or other atmospheric effects, could interfere with local electromagnetic communications.

It should be appreciated that while the system 64 is explained by way of example with regard to a gas turbine engine 20, other machines and machine designs can be modified to incorporate built-in shielding for monitored or controlled component in a guided electromagnetic transmission network. For example, the system 64 can be incorporated in a variety of harsh environment machines, such as manufacturing and processing equipment, a vehicle system, an environmental control system, and all the like. As a further example, the system 64 can be incorporated in an aerospace system, such as an aircraft, rotorcraft, spacecraft, satellite, or the like. The disclosed system 64 includes the network 65, 100 that provides consistent communication with electromagnetic devices, such as the example nodes 68a, 68b, and removes variables encountered with electromagnetic communications such as distance between transmitters and receiving devices, physical geometry in the field of transmission, control over transmission media such as air or fluids, control over air or fluid contamination through the use of filtering or isolation and knowledge of temperature and pressure.

The system 64 provides for a reduction in cable and interconnecting systems to reduce cost and increases reliability by reducing the number of physical interconnections. Reductions in cable and connecting systems further provides for a reduction in weight and additional redundancy. Moreover, additional sensors can be added without the need for additional wiring and physical connections to the controller 66, which may provide for increased system accuracy and response. Embodiments can provide a "plug-n-play" approach to add a new node, potentially without a requalification of the entire system but only the new component; thereby greatly reducing qualification burdens.

Figure 3:
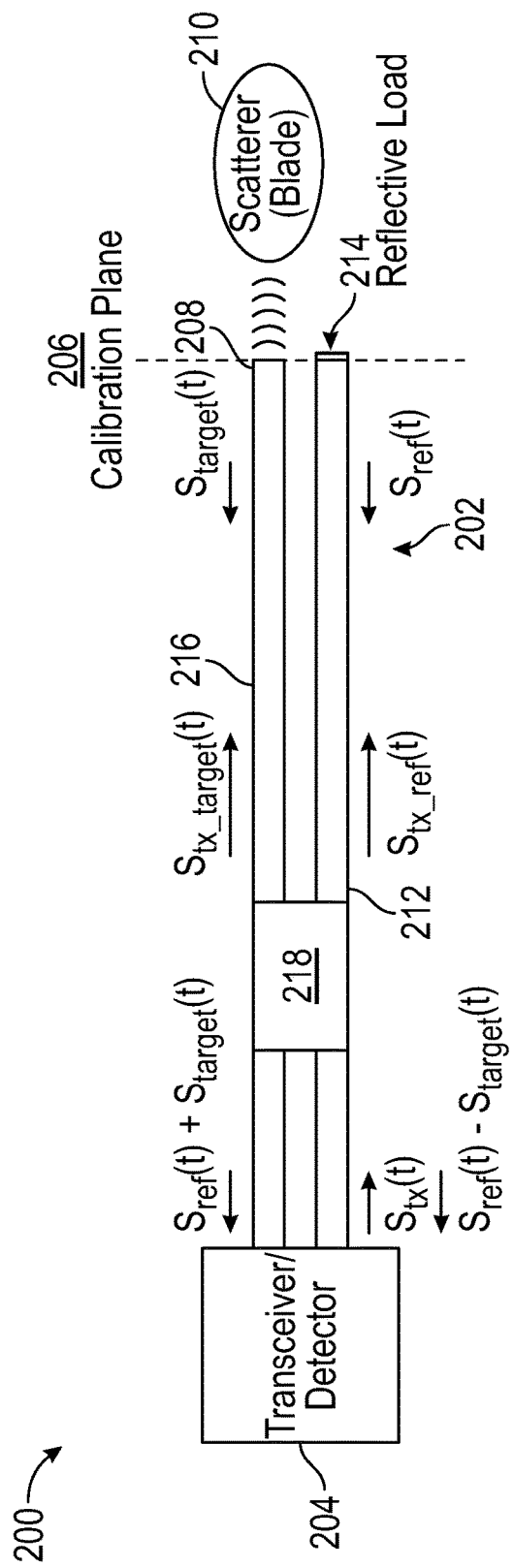
FIG. 3 is a schematic view of a radio frequency sensing system in accordance with an embodiment of the disclosure.

FIG. 3 is a schematic view of a radio frequency sensing system 200, which can be used to implement at least a portion of the radio frequency sensing system 106 of FIG. 2. In the example of FIG. 3, the radio frequency sensing system 200 includes a waveguide system 202 and a radio frequency transceiver/detector 204 coupled to the waveguide system 202 and configured to emit a calibration signal in the waveguide system 202 to establish a reference baseline between the radio frequency transceiver/detector 204 and a calibration plane 206 associated with an aperture 208 of the waveguide system 202, emit a measurement signal in the waveguide system 202 to transmit a radio frequency signal from the radio frequency transceiver/detector 204 out of the aperture 208 of the waveguide system 202, and detect a reflection of the measurement signal at the radio frequency transceiver/detector 204 based on an interaction between the measurement signal and a component of a machine (e.g., gas turbine engine 20 of FIG. 1). The measurement can be detected based on a scattering with respect to a component, such as a blade or other rotating component 210. A measurement result of the reflection of the measurement signal is adjusted with respect to a reflection of the calibration signal. The waveguide system 202 can include a calibration channel 212 with a reflective load 214 configured to reflect the calibration signal emitted from the radio frequency transceiver/detector 204. The waveguide system 202 can also include a measurement channel 216 configured to emit the measurement signal out of the aperture 208 and receive the reflection of the measurement signal. The waveguide system 202 can further include a coupler 218 configured to subtract the reflection of the calibration signal from the reflection of the measurement signal. The coupler 218 can be a hybrid coupler that continuously subtracts the calibration signal from measurement signal as part of an analog process and may reduce the burden on the radio frequency transceiver/detector 204 by eliminating digital computation. The calibration can correct for environmental changes, such as temperature increase (thermal expansion), vibration, strain, and the like in the waveguide system 202.

In the example of FIG. 3, the radio frequency transceiver/detector 204 can emit a microwave signal $s_{tx}(t)$. The signal can be divided into two halves, $s_{tx\_target}(t)$ and $s_{tx\_ref}$, by the coupler 218 as the measurement channel 216 and the calibration channel 212. The transmitted signals reflect back from a reflective load 214 at the end of the calibration channel 212 and in the measurement channel 216 from the target can result in return signals in the waveguide system 202. Return signals in the calibration and measurement channels 212, 216 are named $s_{tx\_ref}(t)$ and $s_{tx\_target}(t)$, respectively. Return signals reflected through the coupler 218 can result in two signals that may be expressed as sum and difference of reflected signals indicated as $s_{tx\_ref}(t)+s_{tx\_target}(t)$ and $s_{tx\_ref}(t)-s_{tx\_target}(t)$. A receiver positioned at the radio frequency transceiver/detector 204 can receive the difference signal, $s_{ref}(t)-s_{target}(t)$. This is a calibrated signal which carries information of a signal bouncing off the target alone. The difference signal can be the signal that carries target information with respect to the waveguide aperture 208. This way, each time a measurement is taken at the transceiver location, the difference signal can be a calibrated signal, and may carry information regarding the target, e.g., the effect of all system components in between radio frequency transceiver/detector 204 and waveguide aperture 208 can be subtracted.

Figure 4:
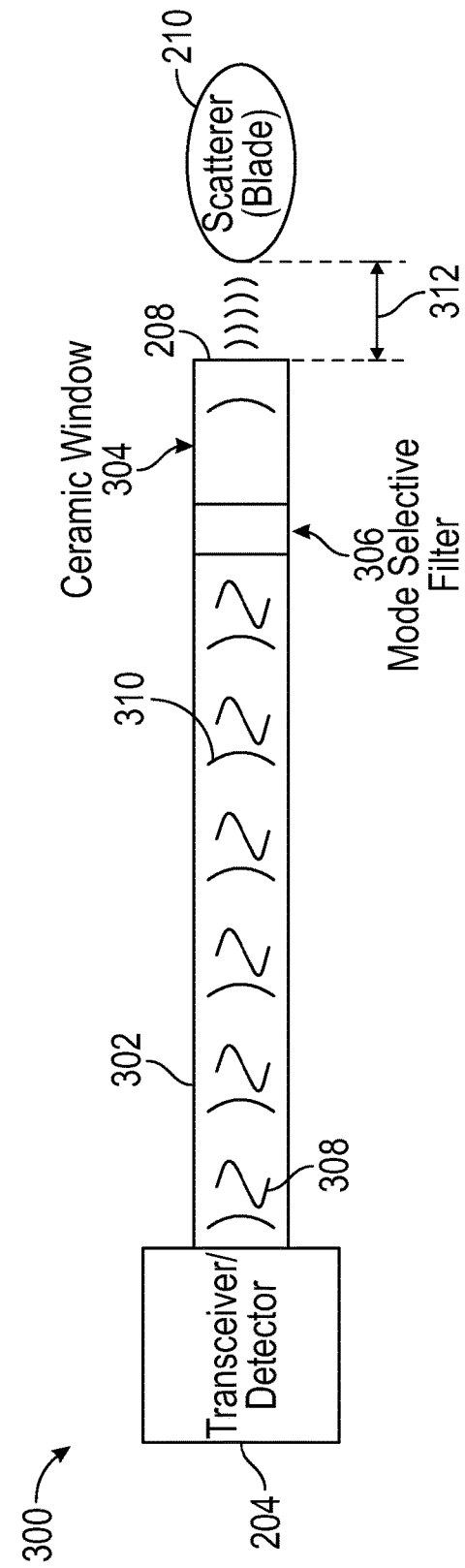
FIG. 4 is a schematic view of a radio frequency sensing system in accordance with an embodiment of the disclosure.

FIG. 4 is a schematic view of a radio frequency sensing system 300, which can be used to implement at least a portion of the radio frequency sensing system 106 of FIG. 2. In the example of FIG. 4, the radio frequency sensing system 300 includes a waveguide system 302 and a radio frequency transceiver/detector 204. The waveguide system 302 can include a ceramic window 304 proximate to an aperture 208 of the waveguide system 302. The ceramic window 304 can be configured to allow radio frequencies, such as microwave frequencies, to exit the aperture 208 while limiting external contaminants from entering the waveguide system 302. Rather than including physically separate waveguide channels for calibration and measurement as in the waveguide system 202 of FIG. 3, the waveguide system 302 can include a mode selective filter 306 proximate to the ceramic window 304. The mode selective filter 306 can be configured to reflect a calibration signal 308 emitted by the radio frequency transceiver/detector 204 and allow a measurement signal 310 emitted by the radio frequency transceiver/detector 204 through the ceramic window 304 based on a mode difference between the calibration signal 308 and the measurement signal 310. The measurement signal 310 can be reflected back with respect to a component, such as a blade or other rotating component 210. Since both the calibration signal 308 and the measurement signal 310 follow substantially the same path within the waveguide system 302, environmental factors that impact the waveguide system 302 can be subtracted out by observing the difference in reflections of the calibration signal 308 and the measurement signal 310 to accurately measure a distance 312 between the aperture 208 and the component 210 as environmental conditions change. The radio frequency transceiver/detector 204 or other system component can be configured to perform the subtraction based on phase or timing using analog or digital techniques.

In the example of FIG. 4, the waveguide system 302 may have a rectangular cross-section with the measurement signal 310 emitted at a dominant mode having a lowest cut-off frequency, which can be referred to as transverse electric (TE) 10 mode, while the calibration signal 308 can be emitted at a higher frequency mode, such as TE 20 mode. The mode selective filter 306 can include structures, such as conductive posts, placed across the waveguide cross section at about ¼ and ¾ positions to reflect the TE 20 mode and allow the TE 10 mode to pass.

Figure 5:
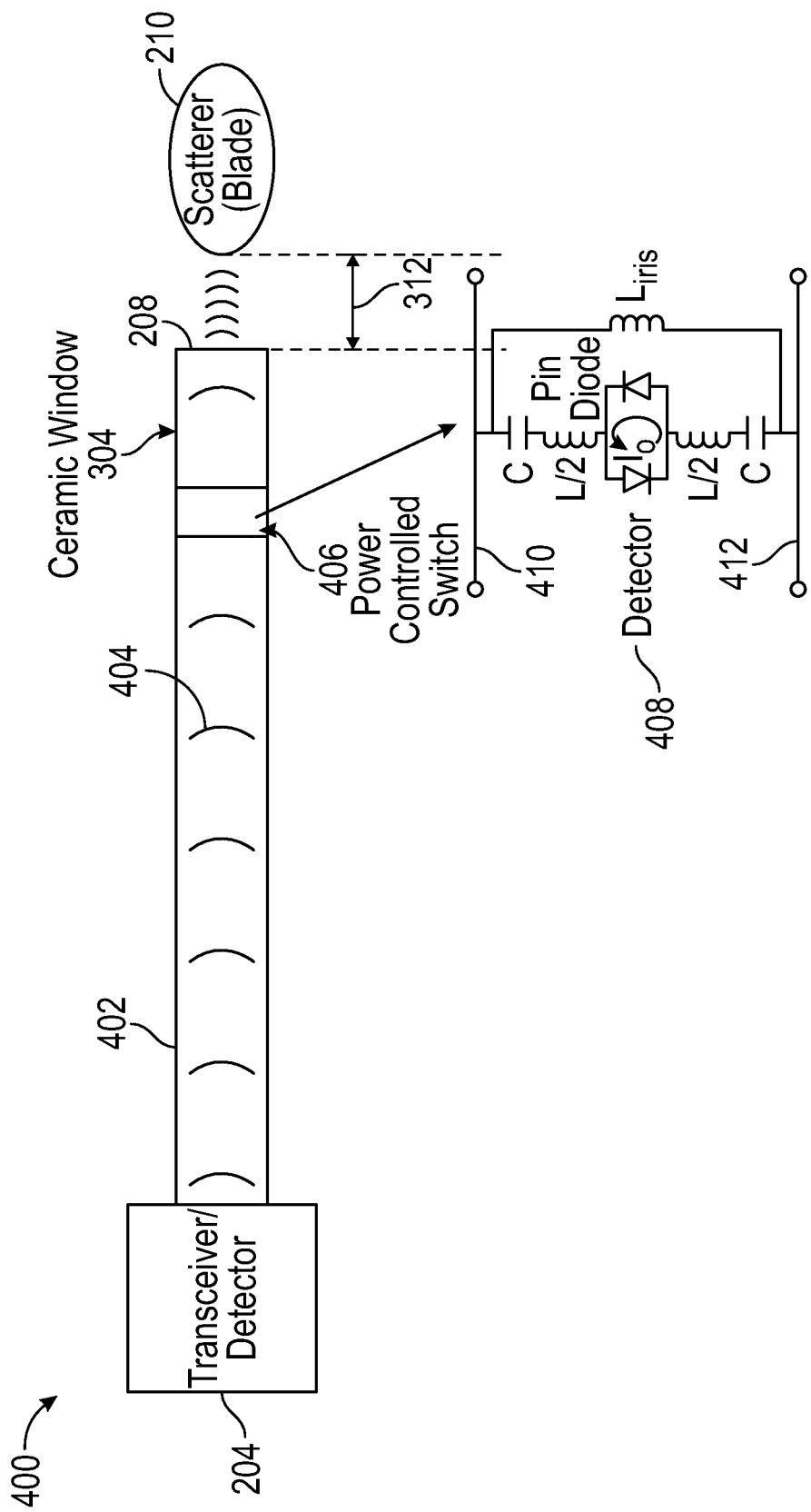
FIG. 5 is a schematic view of a radio frequency sensing system in accordance with an embodiment of the disclosure.

FIG. 5 is a schematic view of a radio frequency sensing system 400, which can be used to implement at least a portion of the radio frequency sensing system 106 of FIG. 2. In the example of FIG. 5, the radio frequency sensing system 400 includes a waveguide system 402 and a radio frequency transceiver/detector 204. The waveguide system 402 can include a ceramic window 304 proximate to an aperture 208 of the waveguide system 402. The ceramic window 304 can be configured to allow radio frequencies, such as microwave frequencies, to exit the aperture 208 while limiting external contaminants from entering the waveguide system 402. Rather than including physically separate waveguide channels for calibration and measurement as in the waveguide system 202 of FIG. 3, the waveguide system 402 can include a power-controlled switch 406 proximate to the ceramic window 304. The power-controlled switch 406 can be configured to reflect a calibration signal emitted by the radio frequency transceiver/detector 204 and allow a measurement signal emitted by the radio frequency transceiver/detector 204 through the ceramic window 304 based on a power difference between the calibration signal and the measurement signal. The measurement signal can be reflected back with respect to a component, such as a blade or other rotating component 210. Since both the calibration signal and the measurement signal follow substantially the same path within the waveguide system 402, environmental factors that impact the waveguide system 402 can be subtracted out by observing the difference in reflections of the calibration signal and the measurement signal to accurately measure a distance 312 between the aperture 208 and the component 210 as environmental conditions change. The radio frequency transceiver/detector 204 or other system component can be configured to perform the subtraction based on phase or timing using analog or digital techniques.

In the example of FIG. 5, radio frequency emissions 404 of the radio frequency transceiver/detector 204 can vary in power to distinguish the calibration signal and the measurement signal. For example, radio frequency emissions 404 for the measurement signal can have a lower amplitude and higher frequency than the calibration signal. The calibration signal and the measurement signal can be multiplexed to switch between emitting each of the calibration signal and the measurement signal. For example, the radio frequency transceiver/detector 204 can emit the measurement signal, switch to emitting the calibration signal, and switch back to emitting the measurement signal over a period of time. As one example, the power-controlled switch 406 can include a detector circuit 408 that may be formed of two diodes having opposing orientations relative to each other. The detector circuit 408 can also include a series connected capacitor (C) and inductor (L/2) between each diode and a corresponding rail 410, 412. An inductor ($L_{iris}$) can also be connected to each rail 410, 412.

Figure 6:
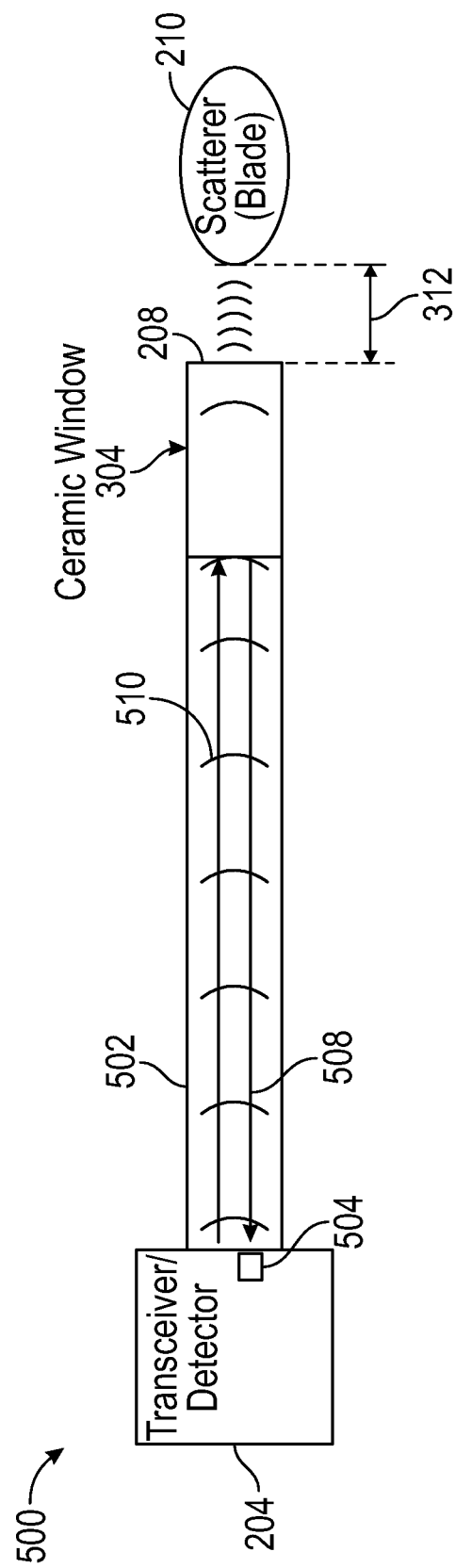
FIG. 6 is a schematic view of a radio frequency sensing system in accordance with an embodiment of the disclosure.

FIG. 6 is a schematic view of a radio frequency sensing system 500, which can be used to implement at least a portion of the radio frequency sensing system 106 of FIG. 2. In the example of FIG. 6, the radio frequency sensing system 500 includes a waveguide system 502 and a radio frequency transceiver/detector 204. The waveguide system 502 can include a ceramic window 304 proximate to an aperture 208 of the waveguide system 502. The ceramic window 304 can be configured to allow radio frequencies, such as microwave frequencies, to exit the aperture 208 while limiting external contaminants from entering the waveguide system 502. The waveguide system 502 can include an optical source emitter and detector 504. The optical source emitter and detector 504 may be incorporated with the radio frequency transceiver/detector 204. The optical source emitter and detector 504 can be configured to emit a calibration signal 508 as an optical signal (e.g., a laser) and detect reflection of the calibration signal 508 off of the ceramic window 304. A measurement signal 510 emitted by the radio frequency transceiver/detector 204 can be a radio frequency signal, such as a microwave signal, configured to pass through the ceramic window 304. The measurement signal 510 can be reflected back with respect to a component, such as a blade or other rotating component 210. Since both the calibration signal 508 and the measurement signal 510 follow substantially the same path within the waveguide system 502, environmental factors that impact the waveguide system 502 can be subtracted out by observing the difference in reflections of the calibration signal 508 and the measurement signal 510 to accurately measure a distance 312 between the aperture 208 and the component 210 as environmental conditions change. The radio frequency transceiver/detector 204 or other system component can be configured to perform the subtraction based on phase or timing using analog or digital techniques.

Figure 7:
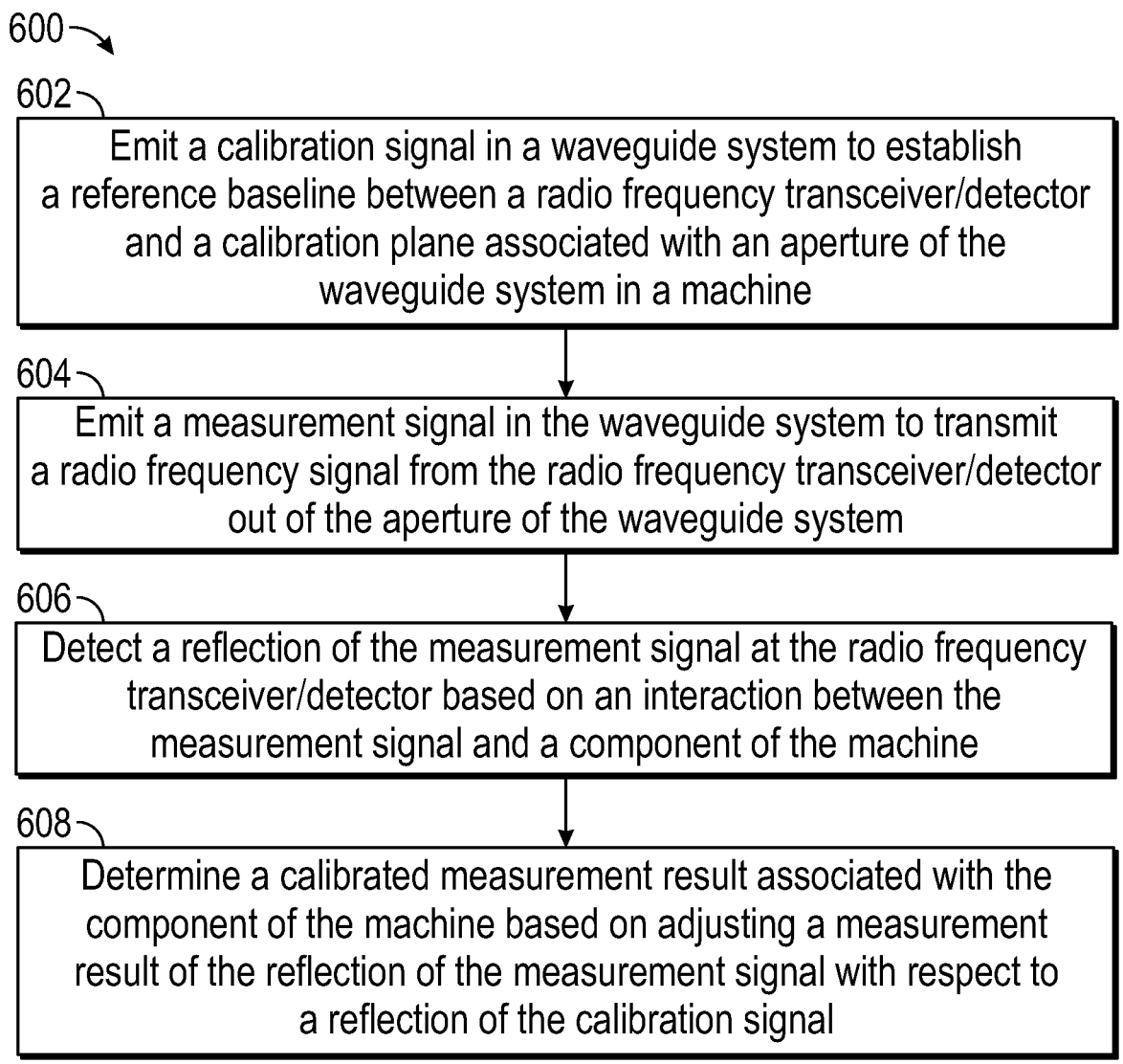
FIG. 7 is a flow chart illustrating a method in accordance with an embodiment of the disclosure.

FIG. 7 is a flow chart illustrating a method 600 of self-referencing radio frequency sensing in a machine, such as the gas turbine engine 20 of FIG. 1 in accordance with an embodiment. The method 600 of FIG. 7 is described in reference to FIGS. 1-6 and may be performed with an alternate order and include additional steps. For purposes of explanation, the method 600 is primarily described in reference to FIG. 1 but can also be implemented on the guided electromagnetic transmission network 100 of FIG. 2 and other network variations and a variety of machines. The machine may operate in or produce a mixed temperature environment including higher temperatures (e.g., >150 degrees C.) beyond the normal range of microelectronics, which is typically less than 100 degrees C. The local temperature at different sections of the machine can vary substantially, such as upstream from combustion, at a fuel combustion location, and downstream from combustion.

At block 602, a calibration signal in a waveguide system 202, 302, 402, 502 is emitted to establish a reference baseline between a radio frequency transceiver/detector 204 and a calibration plane 206 associated with an aperture 208 of the waveguide system 202, 302, 402, 502 in a machine. The machine can be the gas turbine engine 20 of FIG. 1.

At block 604, a measurement signal is emitted in the waveguide system 202, 302, 402, 502 to transmit a radio frequency signal from the radio frequency transceiver/detector 204 out of the aperture 208 of the waveguide system 202, 302, 402, 502.

At block 606, a reflection of the measurement signal is detected at the radio frequency transceiver/detector 204 based on an interaction between the measurement signal and a component 210 of the machine.

At block 608, a calibrated measurement result associated with the component 210 of the machine is determined based on adjusting a measurement result of the reflection of the measurement signal with respect to a reflection of the calibration signal. The reflection of the calibration signal can be subtracted from the reflection of the measurement signal by a coupler 218 of the waveguide system 202, where the coupler 218 can be a 3-dB hybrid coupler having ports to support a calibration channel 212 and a measurement channel 216. In some embodiments, a calibration signal 308 is reflected by a mode selective filter 306, and a measurement signal 310 is allowed to pass through the mode selective filter 306 based on a mode difference between the calibration signal 308 and the measurement signal 310. Alternatively, a calibration signal can be reflected by a power-controlled switch 406, and a measurement signal is allowed to pass through the power-controlled switch 406 based on a power difference between the calibration signal and the measurement signal. As a further alternative, calibration signal 508 is an optical signal configured to reflect off of ceramic window 304, and the measurement signal 510 can be a microwave signal configured to pass through the ceramic window 304.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system of a machine, the system comprising:
a waveguide system; and
a radio frequency transceiver/detector coupled to the waveguide system and configured to:
emit a calibration signal in the waveguide system to establish a reference baseline between the radio frequency transceiver/detector and a calibration plane associated with an aperture of the waveguide system;
emit a measurement signal in the waveguide system to transmit a radio frequency signal from the radio frequency transceiver/detector out of the aperture of the waveguide system; and
detect a reflection of the measurement signal at the radio frequency transceiver/detector based on an interaction between the measurement signal and a component of the machine, wherein a measurement result of the reflection of the measurement signal is adjusted with respect to a reflection of the calibration signal;
wherein the waveguide system comprises a power-controlled switch configured to reflect the calibration signal and allow the measurement signal through the power-controlled switch based on a power difference between the calibration signal and the measurement signal.

2. The system of claim 1, wherein the waveguide system comprises a ceramic window proximate to the aperture of the waveguide system.

3. The system of claim 2, wherein the power-controlled switch is proximate to the ceramic window, wherein the measurement signal is allowed through the ceramic window based on the power difference between the calibration signal and the measurement signal.

4. The system of claim 1, wherein the machine is a gas turbine engine.

5. The system of claim 4, wherein the component of the machine is a rotating component of the gas turbine engine.

6. A system for a gas turbine engine, the system comprising:
   a network of a plurality of nodes distributed throughout the gas turbine engine, each of the nodes associated with at least one sensor and/or actuator of the gas turbine engine and operable to communicate through one or more radio frequencies;
   a controller of the gas turbine engine operable to communicate with the network of nodes through the one or more radio frequencies; and
   a radio frequency sensing system coupled to the network of nodes, the radio frequency sensing system comprising a waveguide system and a radio frequency transceiver/detector coupled to the waveguide system and configured to:
      emit a calibration signal in the waveguide system to establish a reference baseline between the radio frequency transceiver/detector and a calibration plane associated with an aperture of the waveguide system;
      emit a measurement signal in the waveguide system to transmit a radio frequency signal from the radio frequency transceiver/detector out of the aperture of the waveguide system; and
      detect a reflection of the measurement signal at the radio frequency transceiver/detector based on an interaction between the measurement signal and a component of the gas turbine engine, wherein a measurement result of the reflection of the measurement signal is adjusted with respect to a reflection of the calibration signal;
   wherein the waveguide system comprises a power-controlled switch configured to reflect the calibration signal and allow the measurement signal through the power-controlled switch based on a power difference between the calibration signal and the measurement signal.

7. The system of claim 6, wherein the waveguide system comprises a ceramic window proximate to the aperture of the waveguide system.

8. The system of claim 7, wherein the power-controlled switch is proximate to the ceramic window, wherein the measurement signal is allowed through the ceramic window based on the power difference between the calibration signal and the measurement signal.

9. The system of claim 6, wherein the component monitored by the radio frequency sensing system is a rotating component of the gas turbine engine.

10. A method of self-referencing radio frequency sensing in a machine, the method comprising:
    emitting a calibration signal in a waveguide system to establish a reference baseline between a radio frequency transceiver/detector and a calibration plane associated with an aperture of the waveguide system in the machine;
    emitting a measurement signal in the waveguide system to transmit a radio frequency signal from the radio frequency transceiver/detector out of the aperture of the waveguide system;
    reflecting the calibration signal by a power-controlled switch;
    allowing the measurement signal to pass through the power-controlled switch based on a power difference between the calibration signal and the measurement signal;
    detecting a reflection of the measurement signal at the radio frequency transceiver/detector based on an interaction between the measurement signal and a component of the machine; and
    determining a calibrated measurement result associated with the component of the machine based on adjusting a measurement result of the reflection of the measurement signal with respect to a reflection of the calibration signal.

11. The method of claim 10, wherein the machine is a gas turbine engine.

12. The method of claim 11, wherein the component of the machine is a rotating component of the gas turbine engine.

13. The method of claim 10, wherein the waveguide system comprises a ceramic window proximate to the aperture of the waveguide system.

14. The method of claim 13, wherein the power-controlled switch is proximate to the ceramic window.

15. The method of claim 14, wherein the measurement signal is allowed through the ceramic window based on the power difference between the calibration signal and the measurement signal.

* * * * *